US011913354B2

(12) United States Patent
Eneau et al.

(10) Patent No.: US 11,913,354 B2
(45) Date of Patent: Feb. 27, 2024

(54) TURBOMACHINE MOVING BLADE WITH COOLING CIRCUIT HAVING A DOUBLE ROW OF DISCHARGE SLOTS

(71) Applicant: SAFRAN AIRCRAFT ENGINES, Paris (FR)

(72) Inventors: Patrice Eneau, Moissy-Cramayel (FR); Michel Slusarz, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 107 days.

(21) Appl. No.: 17/597,549

(22) PCT Filed: Jul. 22, 2020

(86) PCT No.: PCT/FR2020/051338
§ 371 (c)(1),
(2) Date: Jan. 11, 2022

(87) PCT Pub. No.: WO2021/019156
PCT Pub. Date: Feb. 4, 2021

(65) Prior Publication Data

US 2022/0316344 A1 Oct. 6, 2022

(30) Foreign Application Priority Data

Jul. 30, 2019 (FR) ....................................... 1908655

(51) Int. Cl.
*F01D 5/18* (2006.01)
*F01D 5/30* (2006.01)

(52) U.S. Cl.
CPC ........... *F01D 5/187* (2013.01); *F01D 5/3007* (2013.01); *F05D 2240/30* (2013.01); *F05D 2260/20* (2013.01)

(58) Field of Classification Search
CPC ........ F01D 5/187; F01D 5/3007; F01D 5/186; F05D 2240/30; F05D 2260/20;
(Continued)

(56) References Cited

U.S. PATENT DOCUMENTS 5,342,172 A * 8/1994 Coudray ................ F01D 5/187
416/97 R
6,328,531 B1 * 12/2001 Bariaud ................. F01D 5/187
416/97 R (Continued)

FOREIGN PATENT DOCUMENTS

FR 2678318 A1 12/1992
JP 2003056301 A 2/2003
JP 2014111901 A 6/2014

OTHER PUBLICATIONS

French Search Report issued in French Application FR1908655 dated Apr. 22, 2020 (2 pages).

(Continued)

*Primary Examiner* — Courtney D Heinle
*Assistant Examiner* — Andrew Thanh Bui
(74) *Attorney, Agent, or Firm* — Bookoff McAndrews, PLLC

(57) ABSTRACT

The invention relates to a movable turbomachine blade comprising at least one cooling circuit comprising at least one cavity extending radially between the root and the tip, at least one air intake opening at a radial end of the cavity, a plurality of first discharge slots arranged to open out along the trailing edge between the root and the tip, and a plurality of second discharge slots separate from the first discharge slots and arranged along the trailing edge between the root and the tip, the second discharge slots being offset axially upstream relative to the first discharge slots and each of the first discharge slots being radially offset relative to each of
(Continued)

the second discharge slots, with no overlap between the first and second discharge slots.

10 Claims, 3 Drawing Sheets

(58) Field of Classification Search
CPC ......... F05D 2240/304; F05D 2260/202; F05D 2260/2212
See application file for complete search history.

(56) References Cited

U.S. PATENT DOCUMENTS

| | | | | |
|---|---|---|---|---|
| 6,981,840 | B2 * | 1/2006 | Lee | F01D 5/187 415/115 |
| 8,092,175 | B2 * | 1/2012 | Beeck | F01D 9/065 416/223 R |
| 8,721,285 | B2 * | 5/2014 | Liang | F01D 5/188 415/115 |
| 2014/0003962 | A1 | 1/2014 | Okita et al. | |
| 2018/0016914 | A1 * | 1/2018 | O'Leary | F01D 5/187 |
| 2019/0127283 | A1 * | 5/2019 | Gonzalez | C04B 35/638 |

OTHER PUBLICATIONS

International Search Report issued in International Application PCT/FR2020/051338 dated Sep. 17, 2020 with English Translation (4 pages).

* cited by examiner

[Fig. 1]
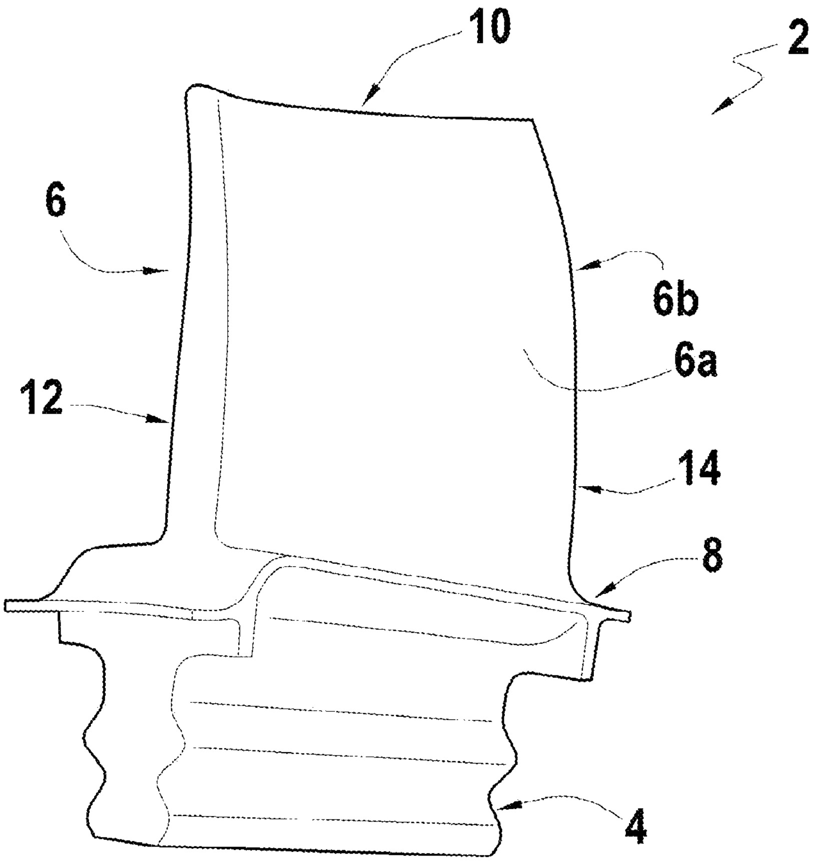

[Fig. 2]
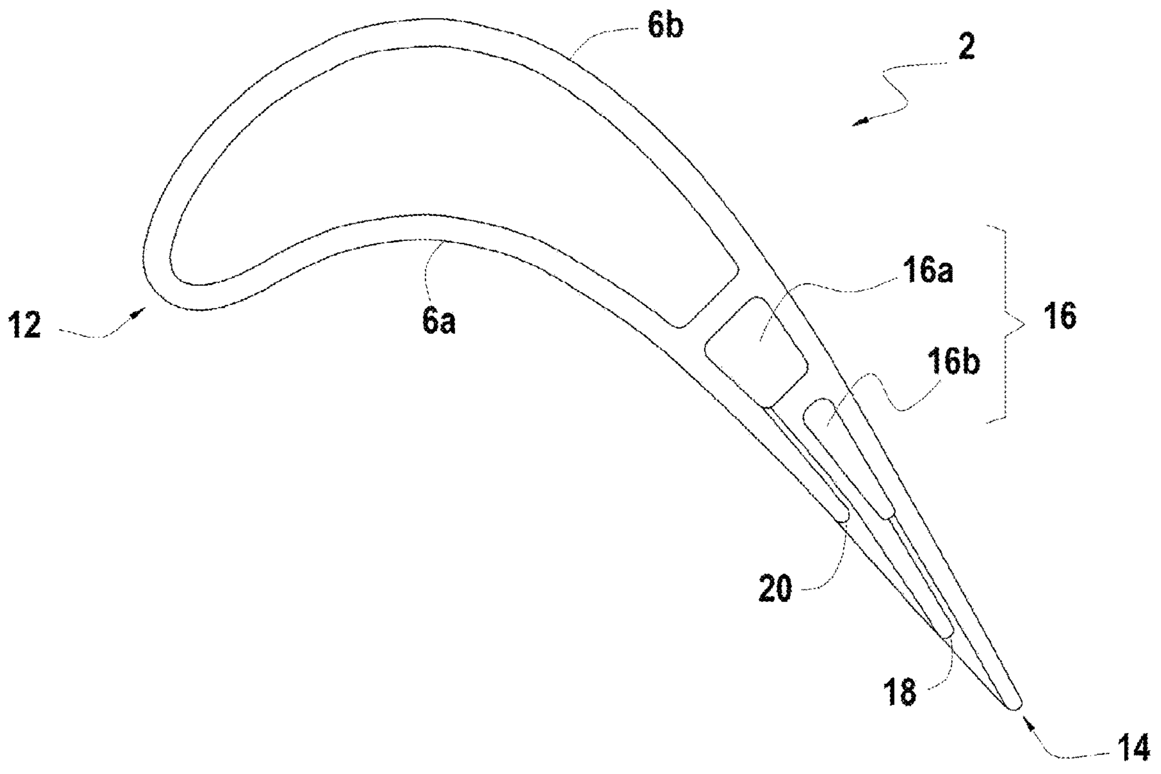

[Fig. 3]
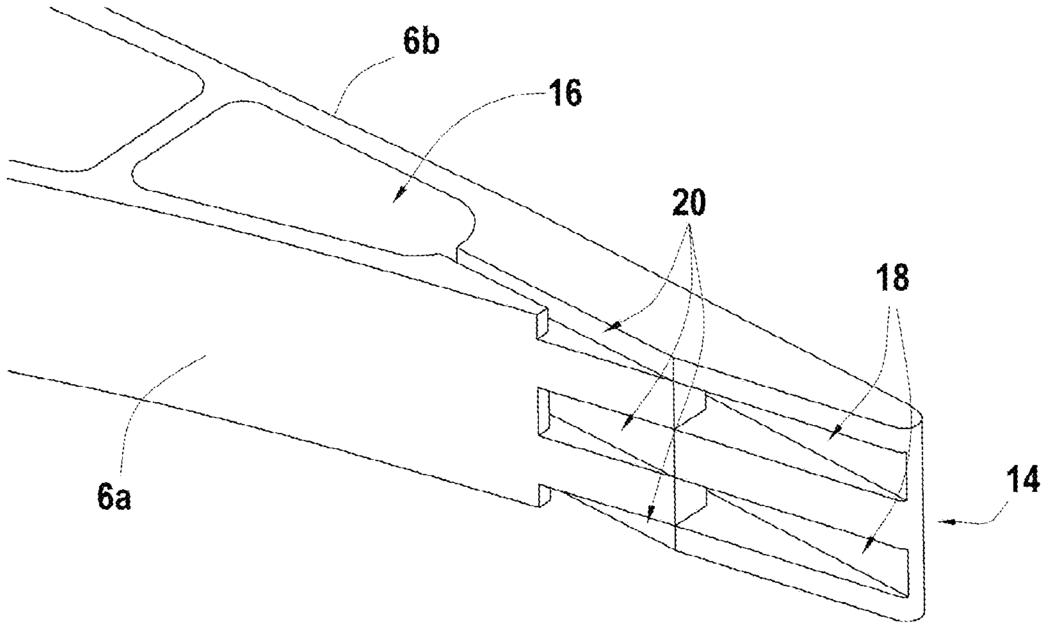
[Fig. 4]
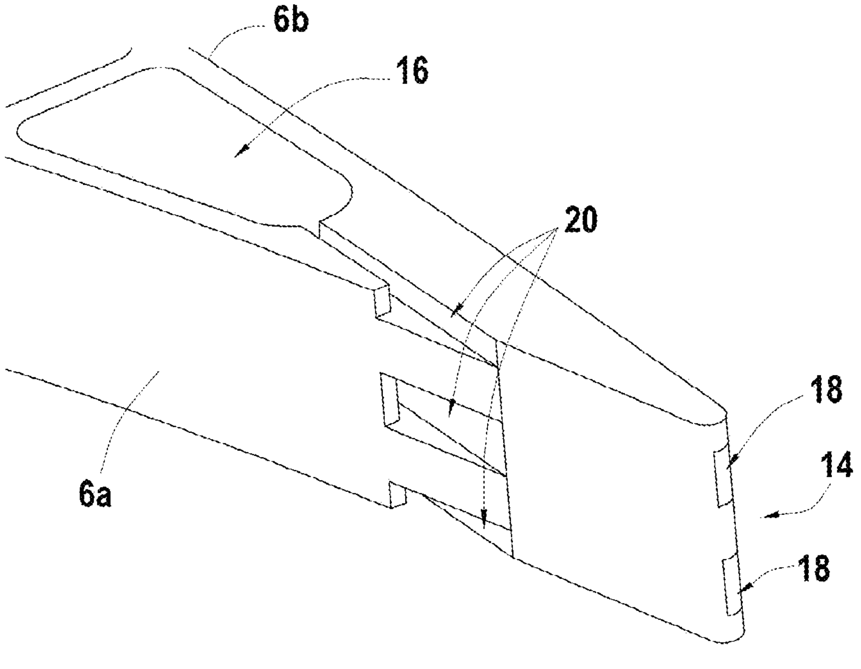

TURBOMACHINE MOVING BLADE WITH COOLING CIRCUIT HAVING A DOUBLE ROW OF DISCHARGE SLOTS

CROSS-REFERENCE TO RELATED APPLICATIONS

This patent application is the U.S. National Stage entry under 35 U.S.C. § 371 of International Patent Application No. PCT/FR2020/051338, filed on Jul. 22, 2020, which claims the benefit of priority to French Patent Application No. 1908655, filed on Jul. 30, 2019. The '655 application is incorporated by reference herein in its entirety.

TECHNICAL FIELD

The present invention relates to the general field of turbomachine blades, and more particularly to the discharge, at the trailing edge, of the cooling air from the blades of a high-pressure turbomachine turbine.

PRIOR ART

The blades of a high-pressure turbomachine turbine are subjected to the high temperatures of the gases derived from the combustion chamber which pass through the high-pressure turbine. These temperatures reach much higher values than those which the blades which are in contact with these gases can withstand, which has the consequence of limiting their service life.

In order to limit the damage caused by these hot gases on the blades, it is known to provide them with inner cooling circuits aimed at reducing the temperature of these blades. Thanks to such circuits, cooling air, which is generally introduced into the blade through its root, passes therethrough by following a path formed by cavities made in the blade before being ejected through slots opening to the surface of the blade, between the root and the tip thereof.

The growing needs in terms of performance, efficiency, service life and reliability lead to design increasingly efficient cooling circuits. Indeed, increasing the efficiency of these cooling circuits has many advantages. Particularly, the permissible thermal level in the flowpath will be higher and the engine more efficient at iso-cooling flow rate. In addition, the cooling flow rate required to guarantee the integrity of the parts cooled by these cooling circuits will be lower for a given operating point. Finally, the service life of these parts will be longer for the same ventilation flow rate and for the same thermodynamic conditions.

With a view to increasing the efficiency of the cooling circuits, it is observed that the trailing edge of the movable blade is a critical area from a thermal and mechanical point of view because of the difficulty in cooling it effectively. This is mainly due to the lack of space, in particular because of the minimum material thicknesses required for the manufacture of the blade, and particularly to the junction of the intrados and extrados walls at the trailing edge.

To effectively cool the trailing edge, it is known to produce, by foundry, discharge slots for the cooling circuits on the intrados side of the blade. These slots allow a cooling of the material at the trailing edge by pumping and by film (film cooling) with an ejection that is almost tangent to the airfoil of the blade, which greatly increases its efficiency.

In contrast, the area of the blade upstream the discharge slots is an area difficult to cool, which regularly displays a high thermal level. This is due in particular to the lack of space to put turbulence promoters for the cooling and to have two cooling cavities in the thickness of the blade.

DISCLOSURE OF THE INVENTION

The aim of the present invention is therefore to propose a movable turbomachine blade which does not have the aforementioned drawbacks.

In accordance with the invention, this aim is achieved thanks to a movable turbomachine blade comprising a vane extending radially between a blade root and a blade tip and axially between a leading edge and a trailing edge, and at least one cooling circuit comprising at least one cavity extending radially between the root and the tip, at least one air intake opening at a radial end of the cavity, a plurality of first discharge slots arranged along the trailing edge between the root and the tip, and a plurality of second discharge slots separate from the first slots and arranged along the trailing edge between the root and the tip, the second discharge slots being offset axially upstream relative to the first discharge slots and each of the first discharge slots being radially offset relative to each of the second discharge slots, with no overlap between the first and second discharge slots.

The invention is remarkable in that it provides for a radially offset additional row of upstream discharge slots with no overlap with respect to the usual row of discharge slots. Thus, this additional row allows benefiting from a cooling upstream of the usual slots. The intrados face of the blade is then cooled on a larger curvilinear abscissa at the trailing edge of the blade. Furthermore, upstream of this additional row of discharge slots, the thickness of the airfoil of the blade is greater, which allows having a cavity provided with cooling promoters or having two separate cavities.

Finally, this radially offset arrangement of the slots of the two rows with no overlap between them allows increasing the cooling efficiency, in particular for the cooling of the slot ribs located downstream.

The first discharge slots and the second discharge slots may open out into the same cavity of the cooling circuit.

Alternatively, the first discharge slots and the second discharge slots can open out into two separate cavities of the cooling circuit.

In this case, the cavity into which the second discharge slots open out is preferably offset axially upstream relative to the cavity into which the first discharge slots open out.

The first discharge slots open out at the trailing edge and the second discharge slots can open out at an intrados face of the blade.

Alternatively, the first discharge slots and the second discharge slots may open at an intrados face of the blade.

The first discharge slots and the second discharge slots can be arranged in columns. Likewise, the second discharge slots can occupy exactly each of the radial spaces left between the first discharge slots.

The invention also relates to a method for manufacturing, by foundry, a blade as defined above, comprising the production of a ceramic core by additive manufacturing, the core making it possible to produce the first discharge slots and the second discharge slots. This manufacturing solution allows producing the foundry cores necessary to reserve the locations for the cavities of the cooling circuit. One object of the invention is also a high-pressure turbomachine turbine comprising a disk which has a plurality of cells which open out at the periphery of the disk and a plurality of blades as defined above.

BRIEF DESCRIPTION OF THE DRAWINGS

FIG. 1 is a perspective view of an example of a blade to which the invention applies.

FIG. 2 is a cross-sectional view of a blade according to one embodiment of the invention showing the cooling circuit of the trailing edge of the blade.

FIG. 3 is a partial and perspective view from the intrados side of a blade according to another embodiment of the invention showing the discharge slots of the cooling circuit of the trailing edge of the blade.

FIG. 4 is a partial perspective view from the intrados side of a blade according to yet another embodiment of the invention.

DESCRIPTION OF THE EMBODIMENTS

FIG. 1 represents in perspective a turbine blade 2, for example a movable blade of a high-pressure turbomachine turbine. The blade 2 is fixed on a turbine rotor (not represented) by means of a generally fir tree root 4.

In known manner, the blade 2 comprises a vane 6 which extends radially between a blade root 8 and a blade tip 10, and axially between a leading edge 12 and a trailing edge 14. The vane 6 of the blade thus defines the intrados 6*a* and the extrados 6*b* of the blade.

The blade 2, which is subjected to the high temperatures of the combustion gases passing through the turbine, needs to be cooled. To this end, and still in a known manner, the blade 2 includes one or several internal cooling circuits, and in particular an internal cooling circuit for the trailing edge.

As represented in FIG. 2, the internal cooling circuit of the trailing edge of the blade comprises at least one cavity 16 extending radially between the root 8 and the tip 10. The cavity 16 is supplied with cooling air at one of its radial ends by an air intake opening (not represented) which is generally provided at the root 4 of the blade.

In the exemplary embodiment represented in FIG. 2, the internal cooling circuit of the trailing edge of the blade comprises two separate cavities 16*a*, 16*b* which are axially offset relative to each other.

According to the invention, the cooling circuit of the trailing edge also comprises a plurality of first discharge slots 18 which are arranged along the trailing edge 14 of the blade between the root 8 and the tip 10, and a plurality second discharge slots 20 which are separate from the first discharge slots 18 and which are also arranged along the trailing edge between the blade root and the blade tip.

In the exemplary embodiment represented in FIG. 2, the first discharge slots 18 open out into the cavity 16*b* of the cooling circuit and open onto the intrados face 6*a* of the blade in the vicinity of its trailing edge 14. As to the second discharge slots 20, they open out into the cavity 16*a* of the cooling circuit and also open onto the intrados face 6*a* of the blade in the vicinity of its trailing edge 14.

Furthermore, as represented more specifically in FIG. 3, the second discharge slots 20 are offset axially upstream relative to the first discharge slots 18 and disposed to be radially offset relative to the first discharge slots with no overlap between them, that is to say, the lower wall of a given slot does not overlap the upper wall of the radially offset adjacent slot and vice versa.

Thus, the first and second discharge slots 18, 20 are arranged so as to form two separate rows of slots which are axially and radially offset relative to each other.

FIG. 3 represents a second embodiment of the invention in which the first discharge slots 18 and the second discharge slots 20 open out into the same cavity 16 of the cooling circuit of the trailing edge of the blade. More specifically, in this example which could not be limited to this supply by a single cavity, the lower walls of the first slots 18 coincide with the upper walls of the second adjacent slots 20 and the upper walls of the first slots 18 coincide with the lower walls of the second adjacent slots 20, so that the second slots occupy exactly each of the radial spaces left between the first slots.

FIG. 4 represents a third embodiment of the invention in which the first discharge slots 18 of the cooling circuit of the trailing edge open out at the trailing edge 14 of the blade, while the second discharge slots 20 open out at the intrados face 6*a* of the blade 2.

The blade 2 according to the invention is obtained directly by molding. For this purpose, the blade is produced by casting a metal in a mold containing a ceramic core which has in particular the function of reserving a location for the cooling circuit of the blade, and in particular for the cavity 16 and the first and second discharge slots 18, 20 of the cooling circuit of the trailing edge of the blade.

In order to obtain the double row of discharge slots directly at the foundry outlet, the ceramic core is advantageously produced by additive manufacturing.

The invention claimed is:

1. A movable turbomachine blade comprising:

a vane extending radially between a blade root and a blade tip and axially between a leading edge and a trailing edge; and at least one cooling circuit comprising at least one cavity extending radially between the root and the tip, at least one air intake opening at a radial end of the cavity, a plurality of first discharge slots arranged to open out along the trailing edge between the root and the tip, and a plurality of second discharge slots separate from the first discharge slots and arranged along the trailing edge between the root and the tip, the second discharge slots being offset axially upstream relative to the first discharge slots and each of the first discharge slots being radially offset relative to each of the second discharge slots, with no radial overlap between the first and second discharge slots.

2. The blade according to claim 1, wherein the first discharge slots and the second discharge slots open out into the same cavity of the cooling circuit.

3. The blade according to claim 1, wherein the first discharge slots and the second discharge slots open out into two separate cavities of the cooling circuit.

4. The blade according to claim 3, wherein the cavity into which the second discharge slots open out is offset axially upstream relative to the cavity into which the first discharge slots open out.

5. The blade according to claim 1, wherein the first discharge slots open out at the trailing edge and the second discharge slots open out at an intrados face of the blade.

6. The blade according to claim 1, wherein the first discharge slots and the second discharge slots open out at an intrados face of the blade.

7. The blade according to claim 1, wherein the first discharge slots and the second discharge slots are arranged in columns.

8. The blade according to claim 1, wherein the second discharge slots occupy exactly each of the radial spaces left between the first discharge slots.

9. A method for manufacturing, by foundry, a blade according to claim 1, comprising the production of a ceramic core by additive manufacturing, the core making it possible to produce the first discharge slots and the second discharge slots.

10. A high-pressure turbomachine turbine comprising a disk which has a plurality of cells which open out at the periphery of the disk and a plurality of blades according to claim 1, the root of each blade being mounted in a respective cell of the disk.

* * * * *